United States Patent [19]

Hayashida et al.

[11] Patent Number: 5,580,912

[45] Date of Patent: Dec. 3, 1996

[54] POLYSILANE COMPOSITIONS

[75] Inventors: Akira Hayashida; Shigeru Mori, both of Kawasaki, Japan

[73] Assignee: Shin-Etsu Chemical Co., Ltd., Tokyo, Japan

[21] Appl. No.: 516,278

[22] Filed: Aug. 17, 1995

[30] Foreign Application Priority Data

Aug. 18, 1994 [JP] Japan .................................. 6-216575

[51] Int. Cl.$^6$ ............................................. C08K 5/3467
[52] U.S. Cl. ................................. 524/88; 528/43
[58] Field of Search ................................. 524/88; 528/43

[56] References Cited

U.S. PATENT DOCUMENTS 4,714,770  12/1987  Hsu et al. ............................. 528/43

*Primary Examiner*—Veronica P. Hoke
*Attorney, Agent, or Firm*—Millen, White, Zelano & Branigan, P.C.

[57] ABSTRACT

A polysilane is blended with a porphyrin or a metal complex thereof. The polysilane composition may further contain a plasticizer. The porphyrin is effective for suppressing photolysis of polysilane.

18 Claims, 3 Drawing Sheets

POLYSILANE COMPOSITIONS

BACKGROUND OF THE INVENTION

1. Field of the Invention

This invention relates to a polysilane composition which is tailored so as to suppress decomposition of polysilane by light, especially UV, for increasing the life of molded products.

2. Prior Art

Polysilane now draws great attention as photo-functional material as well as a ceramic precursor. As is well known in the art, the polysilane is characterized by great absorption in the ultraviolet region, but it experiences a sudden decline of ultraviolet absorption by scission of a silicon-to-silicon bond upon exposure to ultraviolet radiation. The polysilane is regarded promising in such applications as photoresist material for semiconductor devices if this nature can be effectively utilized.

It is also known that polysilane develops electric conduction upon exposure to light or by doping it with oxidizing substances. An attempt is made to utilize polysilane as electrophotographic material.

However, use of polysilane in these applications is precluded by the above-mentioned tendency of polysilane to decompose by ultraviolet radiation, that is, because of the lack of weatherability and durability. The photolysis of polysilane must be restrained before it can be used in a variety of applications.

SUMMARY OF THE INVENTION

Therefore, an object of the present invention is to provide a polysilane composition which suppresses photolysis of polysilane, and can find use in applications where weatherability and durability are required.

We have found that porphyrins or metal complexes thereof are effective for suppressing photolysis of polysilane. Although addition of a plasticizer to polysilane is effective for imparting plasticity to polysilane for improving brittleness as disclosed in Japanese Patent Application Kokai (JP-A) 172656/1994, the plasticized polysilane composition is high in photolysis rate and less resistant to weathering as compared with polysilane. We have found that porphyrins or metal complexes thereof also have the photolysis suppressing effect on the plasticized polysilane composition. Therefore by blending polysilane with a porphyrin or metal complex and optionally, a plasticizer, there is obtained a polysilane composition which can suppress photolysis of polysilane and be widely used in applications where weatherability and durability are required.

Accordingly, the present invention provides a polysilane composition comprising in admixture, a polysilane and a porphyrin or a metal complex thereof. The polysilane composition may further contain a plasticizer.

BEST MODE FOR CARRYING OUT THE INVENTION

Figure 1:
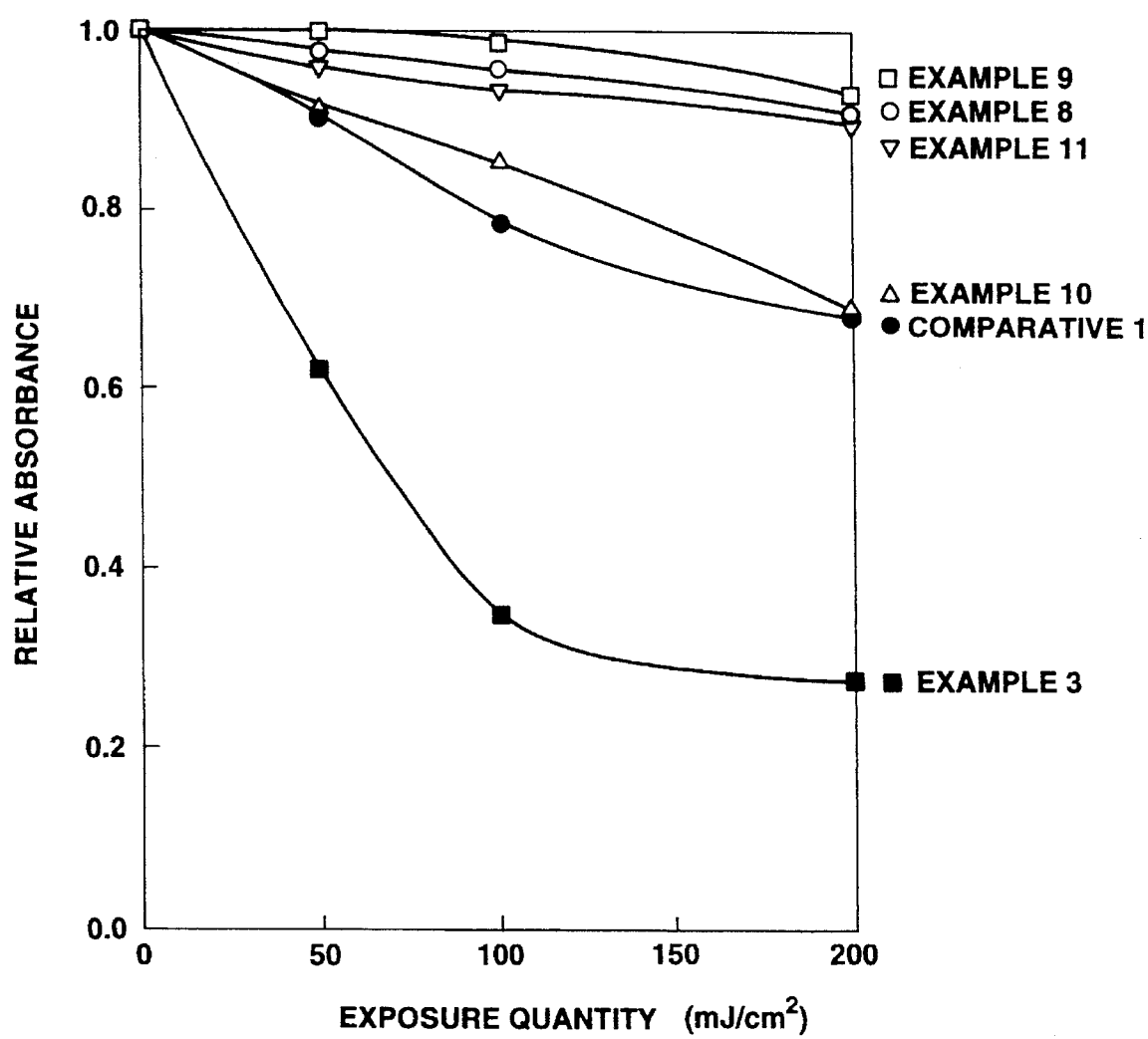
FIG. 1 is a graph showing how the relative absorbance of thin films of Examples changes with an exposure quantity.

The polysilane composition of the present invention is obtained by mixing a polysilane with a porphyrin or a metal complex thereof.

The polysilane used herein includes a silane homopolymer of the following general formula (1):

wherein $R^1$ and $R^2$ each are a hydrogen atom or a monovalent hydrocarbon group and may be identical or different, and letter n is an integer of at least 2 and a silane copolymer of the following general formula (2):

wherein $R^1$, $R^2$, $R^3$ and $R^4$ each are a hydrogen atom or a monovalent hydrocarbon group and may be identical or different, letter n is an integer of at least 2, and m is an integer of at least 1.

In formulae (1) and (2), each of $R^1$, $R^2$, $R^3$ and $R^4$ is a hydrogen atom or a monovalent hydrocarbon group having 1 to 20 carbon atoms, for example, alkyl groups such as methyl, ethyl, propyl and hexyl, aryl groups such as phenyl and alkyl-substituted phenyl, aralkyl groups such as benzyl and phenethyl, and cycloalkyl groups such as cyclohexyl.

Preferably the polysilane has a weight average molecular weight of at least 3,000, especially at least 10,000. Polysilanes with a weight average molecular weight of less than 3,000 would be oily or greasy and not moldable. Polysilanes with a weight average molecular weight of more than about 2,000,000 are rather difficult to prepare.

The polysilane may be synthesized by a conventional technique. Preferably the polysilane is prepared by a Wurtz condensation technique using alkali metal which is a typical technique for the synthesis of polysilane.

The porphyrins and metal complexes thereof may be natural porphyrins although synthetic porphyrins are preferred for thermal stability. Preferred are tetraphenylporphyrin of the following formula (3) and octaethylporphyrin of the following formula (4) as well as metal complexes thereof.

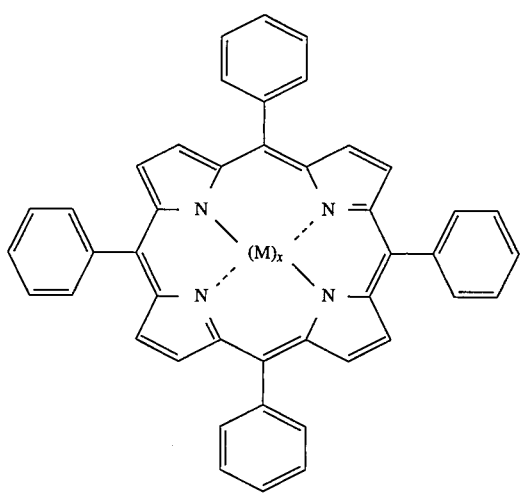

(3)

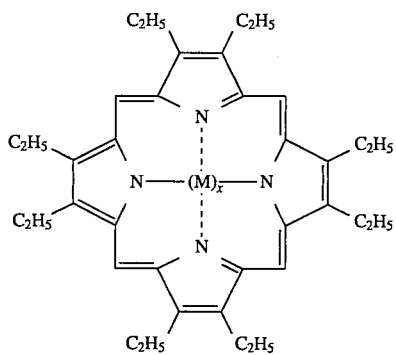

(4)

Note that M is a metal atom and n is 0 or 1.

The center metal M in formulae (3) and (4) includes various metals. Typical examples are Ti, V, Mn, Fe, Co, Zn, Nb, Mo, Rh and Cu.

The porphyrin or its metal complex is preferably added in an amount of 0.01 to 5% by weight, more preferably 0.01 to 3% by weight of the entire composition (the total of the polysilane and the porphyrin or its metal complex). Less than 0.01% of porphyrin would be less effective for suppressing photolysis whereas more than 5% of porphyrin would provide no further increase of its effect and be uneconomical.

A plasticizer may be added to the polysilane composition of the invention. Since plasticized polysilane has a higher photolysis rate than plasticizer-free polysilane as previously mentioned, the addition of porphyrin is more effective to plasticized polysilane systems.

The plasticizers used herein include plasticizers for conventional resins. Depending on a particular application, any suitable one may be selected from the following exemplary plasticizers:

(1) aromatic carboxylic acid esters, for example, phthalates such as dibutyl phthalate and dioctyl phthalate;

(2) saturated or unsaturated aliphatic carboxylic acid esters, such as butyl oleate and dioctyl adipate;

(3) esters of polyhydric alcohols such as diethylene glycol dibenzoate and pentaerythritol esters;

(4) phosphate esters such as trioctyl phosphate and tricresyl phosphate;

(5) epoxy plasticizers such as octyl epoxystearate;

(6) aliphatic compounds such as paraffin and chlorinated paraffin;

(7) alkyl-substituted aromatic compounds such as alkyl benzenes, alkyl-substituted biphenyls, alkyl-substituted terphenyls and alkyl-substituted naphthalenes; and (8) anionic, cationic and nonionic surfactants.

The amount of plasticizer added varies with its type. Typically about 1 to 200 parts by weight, especially about 2 to 100 parts by weight of the plasticizer is added per 100 parts by weight of polysilane. On this basis, less than 1 part of the plasticizer would fail to achieve its purpose whereas more than 200 parts of the plasticizer would detract from transparency and it would be difficult to retain such large amounts of the plasticizer.

The polysilane composition of the invention may be prepared by a conventional technique. Since porphyrin is blended in a minor amount and amenable to uniform dispersion, the preferred procedure is by dissolving the respective components in an identical solvent and mixing the solutions to form a mixture. The mixture is shaped while evaporating the solvent. Alternatively, the solvent is partially evaporated to concentrate the mixture into a viscous liquid which is shaped while distilling off the residual solvent. The solvent used herein includes aromatic hydrocarbon solvents such as benzene and toluene and ether solvents such as tetrahydrofuran.

There has been described a polysilane composition capable of controlling the photo-decomposition, especially UV-decomposition of polysilane. It constitutes a basic blend composition of polysilane which is resistant to weathering and durable, permitting the polysilane to find a wider variety of applications.

EXAMPLE

Examples of the present invention are described below by way of illustration and not by way of limitation.

Reference Example

A 1-liter four-necked round bottom flask equipped with a stirrer, Dimroth condenser, thermometer, and 100-ml dropping funnel was allowed to stand overnight while passing dry nitrogen through the system. The flask was charged with 24.0 g of metallic sodium and 350 ml of dry dodecane and heated at 175° C. in an oil bath. The dropping funnel was charged with 95.5 g (0.5 mol) of phenylmethyldichlorosilane, which was added dropwise to the flask over 30 minutes while maintaining the flask at 175° C.±3° C. After the completion of addition, the flask was maintained at 175° C. for a further 2 hours and then cooled to terminate reaction. In a nitrogen stream, the reaction solution was passed through a glass filter and thoroughly washed with n-octane. The filtered residue was washed with methanol and then water, obtaining a crude product. The crude product was dried and dissolved in 1,000 ml of toluene to form a solution, which was repeatedly washed with water by means of a separatory funnel. After the organic layer was dried over magnesium sulfate, the toluene was distilled off, yielding 43.2 g of crude polysilane.

The crude polysilane was dissolved in toluene again. With stirring, acetone was added to the solution for reprecipitation, yielding 32.4 g of polysilane (yield 54%). Analysis by gel permeation chromatography (GPC) showed a weight average molecular weight of 330,000.

Examples 1–3 & Comparative Example 1

To a 20-mg portion weighed from the polysilane prepared in Reference Example, 5,10,15,20-tetraphenyl-21H,23H-porphynatozinc (simply referred to as tetraphenylporphynatozinc, hereinafter) was added in a varying amount as reported in Table 1. The mixture was dissolved in 500 ml of toluene. The solution was spin coated onto a quartz glass plate at 3,000 rpm for 30 seconds and dried in vacuum at 40° C. for one hour, obtaining a polysilane thin film of 0.4 μm thick.

The thin film was exposed to UV light from a ultra-high pressure mercury lamp through a filter assembly. The filter assembly included a 5-cm cell of an aqueous solution of 100 g/l nickel sulfate hexahydrate, a 1-cm cell of an isooctane solution of 12.8 g/l naphthalene, and a filter CS7-51 (manufactured by Corning Glass Works) and permitted transmission of light having a wavelength of 334 nm. Using a UV spectrometer, the degree of photolysis was monitored with the lapse of time. The quantity of light was 0.044 mW/cm² as measured by a UV intensity meter.

The absorbance at maximum absorption of the irradiated thin film is reported in Table 1 as a ratio relative to that of the initial or non-irradiated thin film, simply referred to as "relative absorbance." Note that an exposure quantity (expressed in mJ) is an integration of light quantity with time.

Table 1

| | Polysilane (mg) | Tetraphenyl-porphynatozinc (mg) | (%) | Relative absorbance 50 mJ | 100 mJ | 200 mJ |
|---|---|---|---|---|---|---|
| CE1 | 20 | 0 | 0 | 0.91 | 0.79 | 0.69 |
| E 1 | 20 | 0.01 | 0.05 | 0.98 | 0.96 | 0.91 |
| E 2 | 20 | 0.5 | 2.4 | 1.00 | 0.98 | 0.96 |
| E 3 | 20 | 1 | 4.8 | 1.00 | 0.98 | 0.97 |

As is evident from Table 1, polysilane is prevented from photolysis when 0.05% or more of tetraphenylporphynatozinc is added thereto.

Examples 4–7 & Comparative Example 2

A thin film was prepared as in Example 1 except that 10 mg of a plasticizer as shown in Table 2 and 0.5 mg of tetraphenylporphynatozinc were added to 20 mg of polysilane. The thin film was similarly exposed to UV light. A thin film of polysilane containing 10 mg of bis(2-ethylhexyl) adipate, but free of tetraphenylporphynatozinc is Comparative Example 2. The absorbance at maximum absorption of the irradiated thin film is reported in Table 2 as a ratio relative to that of the initial or non-irradiated thin film,, "relative absorbance."

TABLE 2

| | Plasticizer | Relative absorbance 50 mJ | 100 mJ | 200 mJ |
|---|---|---|---|---|
| CE2 | bis(2-ethylhexyl) adipate | 0.62 | 0.35 | 0.28 |
| E 4 | bis(2-ethylhexyl) adipate | 0.92 | 0.88 | 0.81 |
| E 5 | bis(2-ethylhexyl) phthalate | 0.93 | 0.88 | 0.82 |
| E 6 | tricresyl phosphate | 0.93 | 0.90 | 0.85 |
| E 7 | diethylene glycol dibenzoate | 0.94 | 0.90 | 0.84 |

As seen from Table 2, the thin film of tetraphenylporphynatozinc-free plasticized silane (Comparative Example 2) experienced a drastic loss of absorbance. In contrast, the thin films of tetraphenylporphynatozinc-containing plasticized silane (Examples 4–7) retarded a loss of absorbance.

Examples 8–11

A thin film was prepared as in Example 1 except that 10 mg of bis(2-ethylhexyl) adipate as a plasticizer and 0.5 mg of a porphyrin or porphyrin metal complex as shown in Table 3 were added to 20 mg of polysilane. The thin film was similarly exposed to UV light. The absorbance at maximum absorption of the irradiated thin film is reported in Table 3 as a ratio relative to that of the initial or non-irradiated thin film, "relative absorbance."

TABLE 3

| | Porphyrin | Relative absorbance 50 mJ | 100 mJ | 200 mJ |
|---|---|---|---|---|
| E 8 | tetraphenylporphyrin | 0.98 | 0.96 | 0.92 |
| E 9 | chloro(tetraphenyl-porphynato)iron (III) | 1.00 | 0.99 | 0.94 |
| E10 | tetraphenylporphynato-copper (II) | 0.92 | 0.86 | 0.70 |
| E11 | (tetraphenylporphynato)-oxovanadium (IV) | 0.96 | 0.94 | 0.91 |

As seen from Table 3, various porphyrin compounds are effective for suppressing absorbance losses by light exposure.

In the diagram of FIG. 1, the relative absorbance is plotted relative to the exposure quantity. It is evident that the addition of porphyrin to polysilane is effective for preventing photolysis of polysilane.

Figure 2:
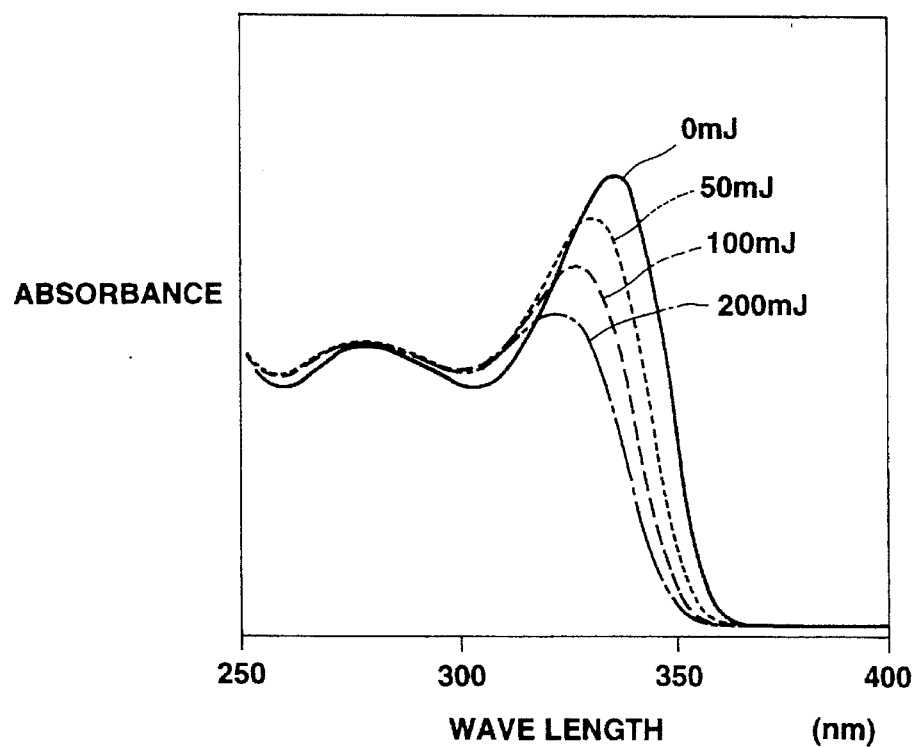
FIG. 2 is a graph showing spectral changes of absorbance at various exposure quantities of the thin film of Comparative Example 1.
Figure 3:
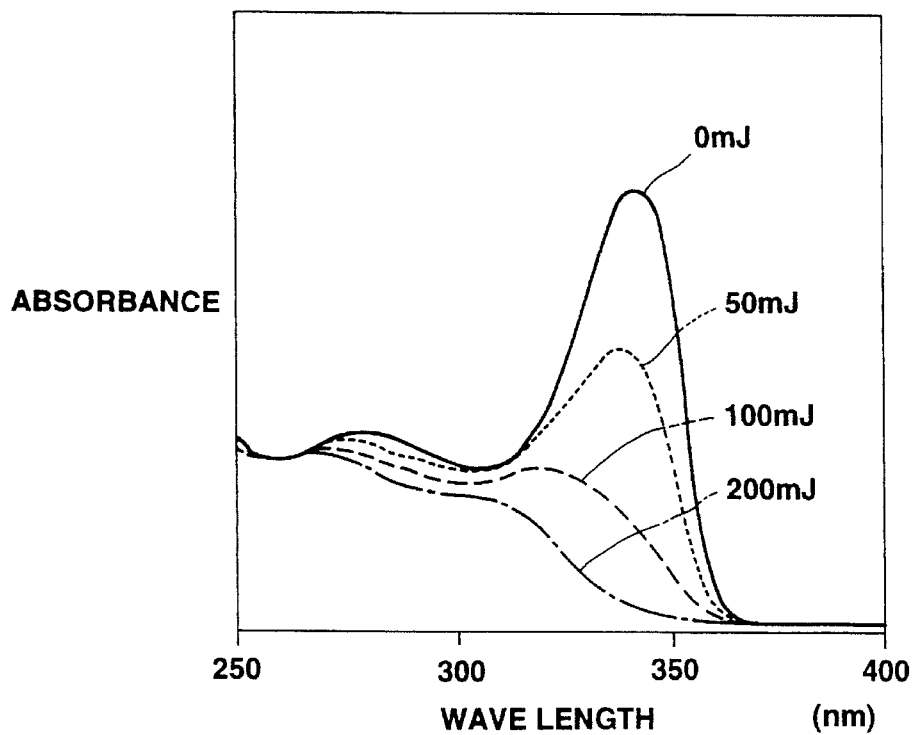
FIG. 3 is a graph showing spectral changes of absorbance at various exposure quantities of the thin film of Comparative Example 2.
Figure 4:
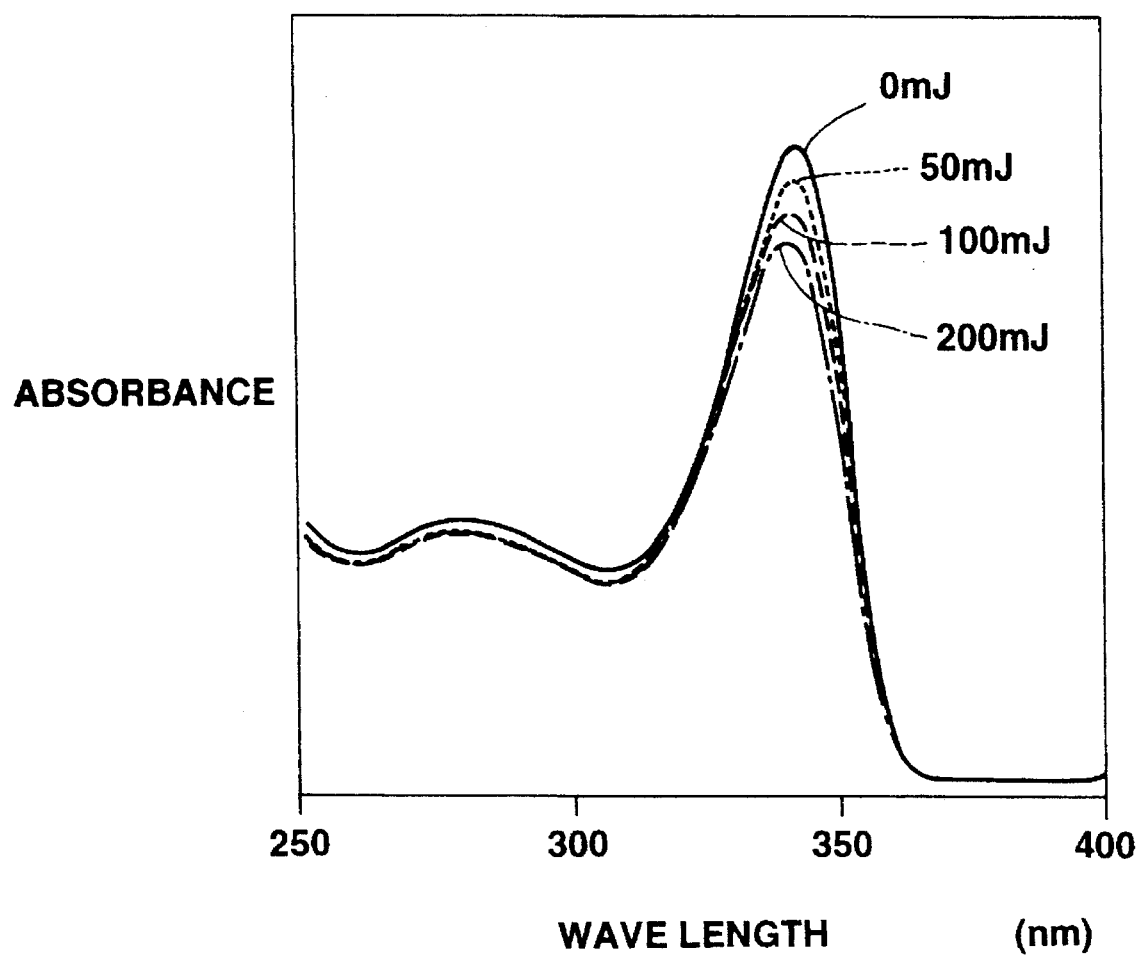
FIG. 4 is a graph showing spectral changes of absorbance at various exposure quantities of the thin film of Example 4.

Spectral changes of absorbance at various exposure quantities of the thin films of Comparative Example 1, Comparative Example 2 and Example 4 are shown in FIGS. 2, 3 and 4, respectively.

Japanese Patent Application No. 216575/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A polysilane composition comprising in admixture, a polysilane, and a porphyrin or a metal complex of a porphyrin, in an amount sufficient to suppress photolysis of said polysilane.

2. A polysilane composition of claim 1, further comprising a plasticizer.

3. A polysilane composition of claim 1, wherein said polysilane is a silane homopolymer of formula (1):

wherein $R^1$ and $R^2$ are each independently a hydrogen atom or a monovalent hydrocarbon group, and n is an integer of at least 2, or a silane copolymer of formula (2):

wherein $R^1$, $R^2$, $R^3$ and $R^4$ are each independently a hydrogen atom or a monovalent hydrocarbon group, n is an integer of at least 2, and m is an integer of at least 1; and wherein said porphyrin or metal complex of a porphyrin is of formula (3) or (4):

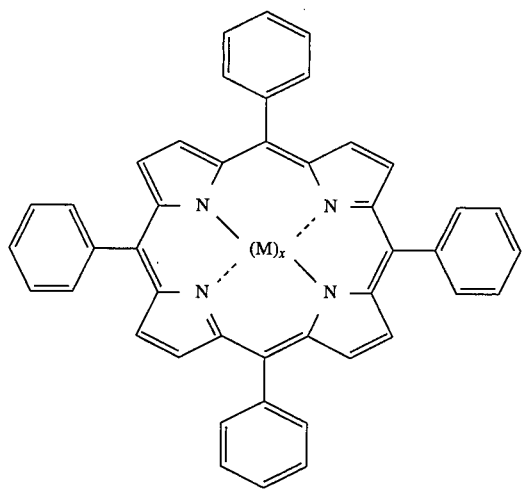

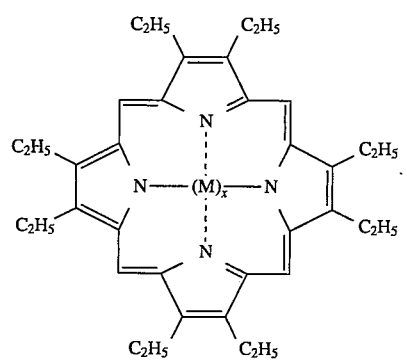

wherein M is a metal atom and x is 0 or 1.

4. A polysilane composition of claim 2, wherein said polysilane is a silane homopolymer of formula (1):

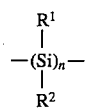

wherein $R^1$ and $R^2$ are each independently a hydrogen atom or a monovalent hydrocarbon group, and n is an integer of at least 2, or a silane copolymer of formula (2):

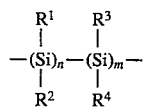

wherein $R^1$, $R^2$, $R^3$ and $R^4$ are each independently a hydrogen atom or a monovalent hydrocarbon group, n is an integer of at least 2, and m is an integer of at least 1; and wherein said porphyrin or metal complex of a porphyrin is of formula (3) or (4):

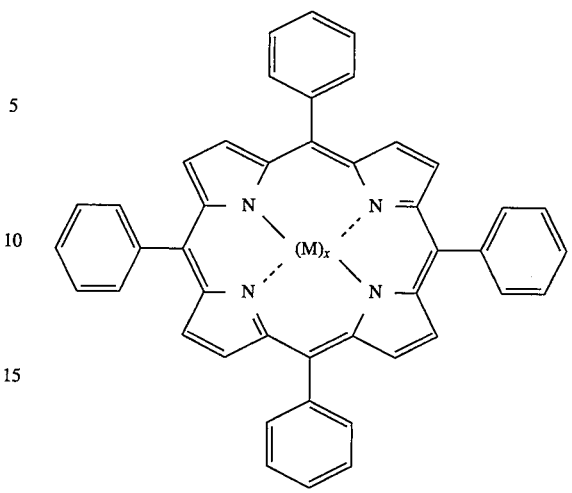

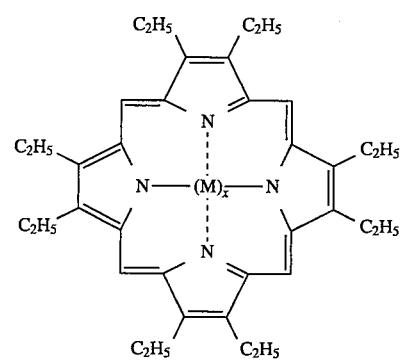

wherein M is a metal atom and x is 0 or 1.

5. A polysilane composition according to claim 1, wherein said polysilane is a silane homopolymer of formula (1):

wherein $R^1$ and $R^2$ are each independently a hydrogen atom or a monovalent hydrocarbon group, and n is an integer of at least 2, or a silane copolymer of formula (2):

wherein $R^1$, $R^2$, $R^3$ and $R^4$ are each independently a hydrogen atom or a monovalent hydrocarbon group, n is an integer of at least 2, and m is an integer of at least 1.

6. A polysilane composition according to claim 1, wherein said porphyrin or metal complex of a porphyrin is of formula (3) or (4):

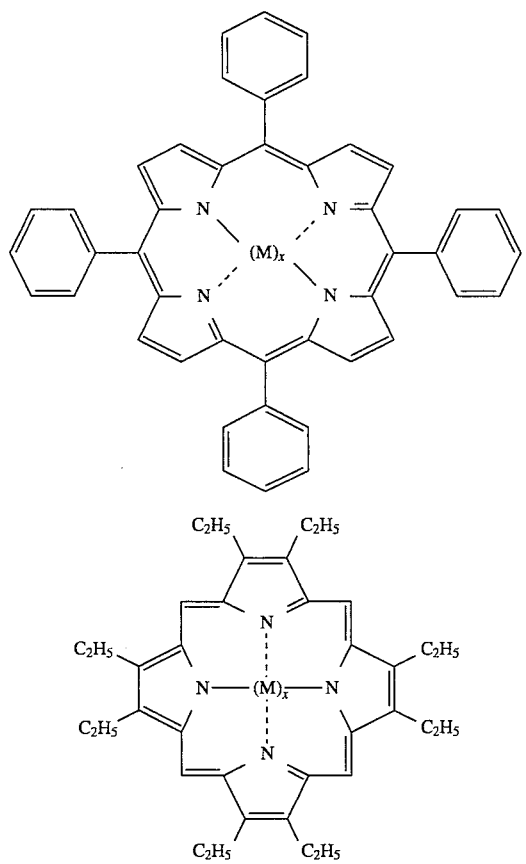

(3)

(4)

wherein M is a metal atom and x is 0 or 1.

7. A polysilane composition according to claim 5, wherein, in formula (1), $R^1$ and $R^2$ are each, independently, a hydrogen atom or a monovalent hydrocarbon group having 1–20 C atoms, and, in formula (2), each of $R^1$, $R^2$, $R^3$ and $R^4$ is, independently, a hydrogen atom or a monovalent hydrocarbon group having 1–20 C atoms.

8. A polysilane composition according to claim 1, wherein said polysilane has a weight average molecular weight of 3,000 to 2,000,000.

9. A polysilane composition according to claim 3, wherein M is Ti, V, Mn, Fe, Co, Zn, Nb, Mo, Rh or Cu.

10. A polysilane composition according to claim 4, wherein M is Ti, V, Mn, Fe, Co, Zn, Nb, Mo, Rh or Cu.

11. A polysilane composition according to claim 5, wherein M is Ti, V, Mn, Fe, Co, Zn, Nb, Mo, Rh or Cu.

12. A polysilane composition according to claim 6, wherein M is Ti, V, Mn, Fe, Co, Zn, Nb, Mo, Rh or Cu.

13. A polysilane composition according to claim 2, wherein the amount of plasticizer is 1 to 200 parts by weight per 100 parts by weight of polysilane.

14. A polysilane composition according to claim 2, wherein the amount of plasticizer is 2 to 100 parts by weight per 100 parts by weight of polysilane.

15. A polysilane composition according to claim 3, wherein $R^1$, $R^2$, $R^3$, $R^4$ are each selected from hydrogen, methyl, ethyl, propyl, hexyl, phenyl, benzyl, phenethyl or cyclohexyl.

16. A polysilane composition according to claim 2, wherein said plasticizer is an aromatic carboxylic acid ester, a saturated or unsaturated aliphatic carboxylic acid ester, an ester of a polyhydric alcohol, a phosphate ester, an epoxy, an aliphatic compound, an alkyl substituted aromatic compound, an anionic surfactant, a cationic surfactant, or a nonionic surfactant.

17. A polysilane composition comprising in admixture,
a polysilane, and
a porphyrin or a metal complex of a porphyrin, wherein the amount of porphyrin or said metal complex of a porphyrin is 0.01–5 wt. % based on the total weight of polysilane and porphyrin or metal complex of a porphyrin.

18. A polysilane composition according to claim 17, wherein the amount of said porphyrin or said metal complex of a porphyrin is 0.01 to 3% by weight of the total amount of polysilane and said porphyrin or said metal complex of a porphyrin.

* * * * *